No. 781,047. PATENTED JAN. 31, 1905.
O. J. CHAPIN.
GATE.
APPLICATION FILED JULY 29, 1904.

Witnesses
Margaret McDonald
Robert H. Dooling

Inventor.
Orlo J. Chapin.
By Atty N. DuBois.

No. 781,047. Patented January 31, 1905.

UNITED STATES PATENT OFFICE.

ORLO J. CHAPIN, OF SPRINGFIELD, ILLINOIS, ASSIGNOR OF ONE-HALF TO COLON J. DUDLEY, OF HAMBURG, NEW YORK.

GATE.

SPECIFICATION forming part of Letters Patent No. 781,047, dated January 31, 1905.

Application filed July 29, 1904. Serial No. 218,650.

*To all whom it may concern:*

Be it known that I, ORLO J. CHAPIN, a citizen of the United States, residing at Springfield, in the county of Sangamon and State of Illinois, have invented certain new and useful Improvements in Gates, of which the following is such a full, clear, and exact description as will enable others skilled in the art to which it appertains to make and use my said invention.

My invention relates to gates of that class commonly known as "jump-gates."

The purposes of my invention are to provide a portable and stable structure adapted to support the gate-frame and connected parts, to provide improved means for simultaneously operating all of the arms supporting the gate-frame, and to provide simple and effective means for connecting with the supporting structure the arms on which the gate-frame is mounted.

With these ends in view my invention consists of the novel features of construction and combinations of parts shown in the annexed drawings, to which reference is hereby made and in which similar reference-letters designate like parts in the several views.

Figure 1:
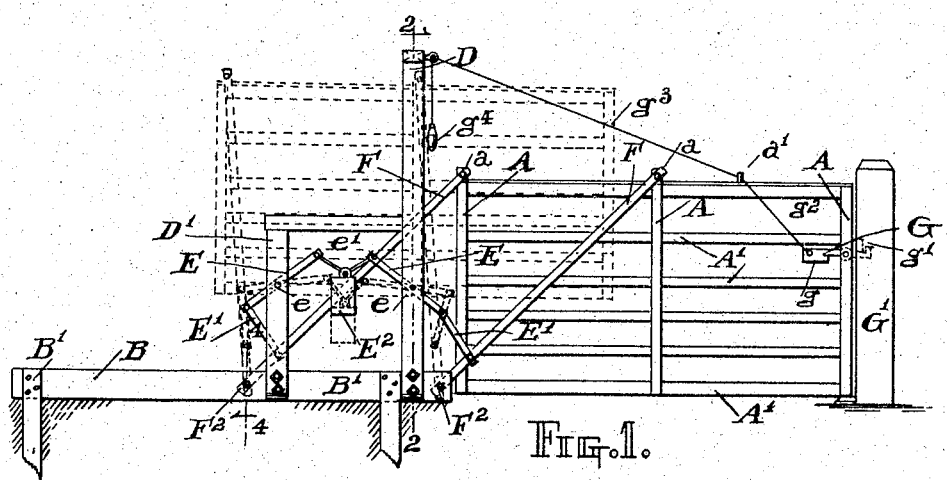
Figure 4:
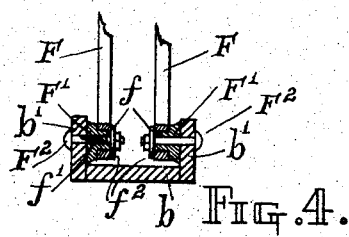
Figure 2:
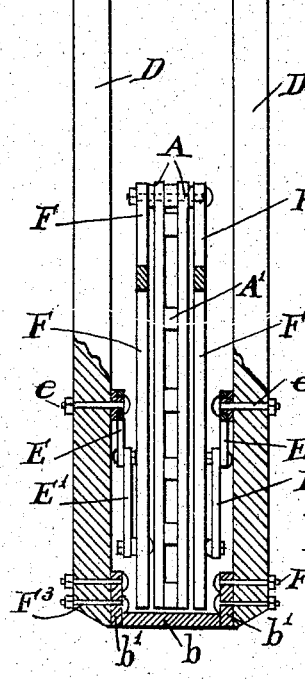
Figure 3:
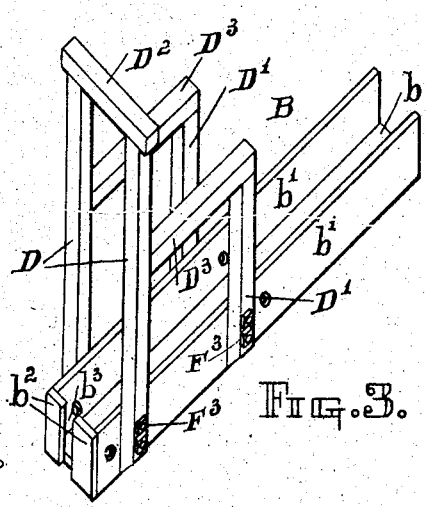

Referring to the drawings, Figure 1 is a side elevation of the complete gate closed. In this view the positions of the gate-frame and connected parts when the gate is partially open are indicated by dotted lines. Fig. 2 is an enlarged partial vertical section on the line 2 2 of Fig. 1. Fig. 3 is an isometric projection of the supporting structure detached, and Fig. 4 is an enlarged partial vertical transverse section on the line 4 4 of Fig. 1 and shows the means for connecting the arms with the box.

The gate-frame, which is preferably of wood, though other suitable material may be used, is rectangular in form and consists of upright pieces A in pairs, secured to and connecting parallel horizontal rails A', which lie between the uprights. The pair of uprights at one end and the middle pair of uprights project somewhat above the top rail, as shown in Fig. 1.

The main structure supporting the gate-frame and connected parts consists of a box B, open at one end and partially open at the other, and posts D and D', secured in a vertical position on said box, as hereinafter described.

The box B consists of a bottom piece $b$, side pieces $b'$, secured to the bottom piece, and end pieces $b^2$, respectively secured to the sides of the box, so as to partially close one end thereof and leave an opening $b^3$, through which the gate moves between the end pieces.

The box B may be secured in position by stakes B', driven into the ground on each side of the box, or by any suitable securing device.

Vertical posts D and D' at suitable distance apart are secured on the side pieces $b'$ of the box by bolts $F^3$. A cross-piece $D^2$ connects the upper ends of the posts D.

Horizontal rails $D^3$ respectively connect the upper ends of the posts D' with the posts D. Two pairs of levers E turn on bolts $e$, passing through the levers and through the posts D and D' and connect the levers with the posts. Two pairs of arms F have their upper ends pivotally connected with the uprights A by bolts $a$ and have their lower ends pivotally connected with the side pieces $b'$ of the box B.

Plates F' have integral hubs $f$, pierced by holes $f'$. The holes through the lower ends of the arms F fit around the hubs $f$. Bolts $F^2$ pass through the plates F' and through the side pieces $b'$. Washers $f^2$ on the bolts $F^2$ bear against the sides of the arms F and prevent lateral movement of the arms.

Connecting-rods E' have one end pivotally connected with the lower ends of the levers E, respectively, and the other end pivotally connected with the arms F, respectively.

Weights $E^2$ are supported on the levers E by rods $e'$ or equivalent devices and serve to counterbalance the gate-frame and the arms on which it is mounted to such extent that a slight quick pull on either of the handles $g^4$ will suffice to raise the gate-frame and carry it beyond the centers of the lower axes of the arms F, so that the gate-frame will after passing the center gravitate to open or close the gate, as the case may be. There are two weights $E^2$. A single weight $E^2$ is connected to the upper ends of both levers E on each side of the gate.

A latch G, mounted between the uprights A at one end of the gate, has at its inner end an integral weight $g$, which gravitates to normally hold the other end of the latch in engagement with a suitable stop $g'$ on a stationary gate-post $G'$. A cord $g^2$ is connected with the latch G and passes through an eye $a'$ on the gate-frame. Cords $g^3$, connected with the cord $g^2$, are suitably supported on posts placed in the usual well-known position on either side of the gate and have handles $g^4$, which may be pulled to release the latch and raise the gate-frame, as hereinafter explained.

The box B, the posts D and D', the cross-piece $D^2$, and the rails $D^3$ constitute a substantial and portable main structure or supporting-frame, which may be secured on the ground in any desired position by stakes B', driven into the ground on each side of the box.

In assembling the parts the post G is first firmly planted in a vertical position. The supporting structure is then placed in proper position relative to the post G' and is leveled so that the posts D will extend vertically. The upper ends of the arms F are then connected with the upper ends of the uprights A, and the lower ends of the arms are connected with the sides of the box by the bolts $F^2$, as already described. The levers E are then mounted on the posts D and D', the connecting-rods E' are connected with the levers E and the arms F, and the weights $E^2$ are connected with the upper ends of the levers E. The cords $g^2$ and $g^3$ are then connected with the latch, as described. The parts being assembled as described, the gate is in operative position, such that in order to either open or close the gate it is only necessary to pull quickly down and immediately release either of the handles $g^4$, thereby releasing the latch and raising the gate-frame over the center to the position indicated by dotted lines in Fig. 1, so that the frame will gravitate to open or close the gate, as the case may be.

By employing the weighted levers E, arranged in pairs, one pair being connected with both of the arms E on one side of the gate-frame and the other pair being connected with both of the arms on the other side of the gate-frame, great uniformity of action is attained and the levers operate to move all of the arms simultaneously, so as to cause the gate-frame to travel in a straight line and so as to prevent wabbling or rocking of the gate-frame. This construction is of great practical advantage, because it greatly facilitates the operation of the gate and obviates the stopping of the gate on the center.

Having fully described my invention, what I claim as new, and desire to secure by Letters Patent, is—

1. In a gate, a main structure consisting of a box and vertical posts secured thereon, in combination with arms in pairs mounted to oscillate in said box, levers in pairs mounted on said main structure, weights connected with said levers, connecting-rods connecting said levers with said arms, and a gate-frame pivotally connected with said arms, as set forth.

2. In a gate, the combination of parallel vertical posts in pairs, levers in pairs mounted on said pairs of posts respectively, weights respectively connected with said pairs of levers, arms in pairs mounted to oscillate between the pairs of posts, connecting-rods connecting both levers of one pair with both arms on one side of the gate-frame and connecting both levers of the other pair with both arms on the other side of the gate-frame, and a gate-frame mounted on said oscillating arms, as set forth.

In witness whereof I have hereunto subscribed my name, at Springfield, Illinois, this 30th day of June, 1904.

ORLO J. CHAPIN.

Witnesses:
 MARGARET McDONALD,
 N. DU BOIS.